(12) United States Patent
Anand

(10) Patent No.: US 10,389,818 B2
(45) Date of Patent: Aug. 20, 2019

(54) MONITORING A NETWORK SESSION

(71) Applicant: AppDynamics LLC, San Francisco, CA (US)

(72) Inventor: Puneet Anand, Mountian View, CA (US)

(73) Assignee: Cisco Technology, Inc., San Jose, CA (US)

( * ) Notice: Subject to any disclaimer, the term of this patent is extended or adjusted under 35 U.S.C. 154(b) by 343 days.

(21) Appl. No.: 14/814,762

(22) Filed: Jul. 31, 2015

(65) Prior Publication Data
US 2017/0034282 A1 Feb. 2, 2017

(51) Int. Cl.
*H04L 29/08* (2006.01)
*H04L 12/26* (2006.01)

(52) U.S. Cl.
CPC .......... *H04L 67/14* (2013.01); *H04L 43/04* (2013.01); *H04L 43/06* (2013.01); *H04L 67/02* (2013.01); *H04L 67/22* (2013.01); *H04L 43/08* (2013.01)

(58) Field of Classification Search
None
See application file for complete search history.

(56) References Cited

U.S. PATENT DOCUMENTS

| | | | |
|---|---|---|---|
| 7,506,047 B2* | 3/2009 | Wiles, Jr. ............ | G06F 11/3414 707/999.001 |
| 8,930,818 B2* | 1/2015 | Cordasco ............. | G06F 11/328 715/704 |
| 9,154,365 B1* | 10/2015 | Henry ................ | H04L 29/08072 |
| 9,766,769 B1* | 9/2017 | Webber ................ | G06F 3/0481 |
| 10,048,994 B2* | 8/2018 | Couture ................. | G06F 16/00 |
| 2002/0112048 A1* | 8/2002 | Gruyer .................. | G06Q 30/02 709/224 |
| 2002/0198985 A1* | 12/2002 | Fraenkel ............. | G06F 11/3419 709/224 |
| 2003/0023712 A1* | 1/2003 | Zhao ..................... | H04L 41/046 709/223 |
| 2004/0068560 A1* | 4/2004 | Oulu .................... | G06F 11/3495 709/224 |
| 2005/0015621 A1* | 1/2005 | Ashley ................ | H04L 63/0227 726/4 |
| 2006/0218279 A1* | 9/2006 | Yamaguchi ......... | H04L 67/1008 709/226 |
| 2007/0271375 A1* | 11/2007 | Hwang ............... | G06F 11/3419 709/224 |

(Continued)

*Primary Examiner* — Joshua Joo
(74) *Attorney, Agent, or Firm* — Behmke Innovation Group LLC; James Behmke; Stephen D. LeBarron

(57) ABSTRACT

A session, consisting of multiple page views by a user with a web service, is monitored, analyzed, and diagnosed for a user. The session may include one or more requests or page views experienced by a user during the session. The session may be defined as the user experience on a series of network content pages visited through a single instance of a network browser. The session may be determined to end when no activity is detected from the user for a specified period of time. In other implementations, a session may be based on a user indication, a set period of time, or for some other reason. The data is collected by one or more agents throughout the system, reported to a controller, and correlated together at the controller for querying and reporting. The correlated data is reported by the controller to a user through an interface.

27 Claims, 6 Drawing Sheets

(56) References Cited

U.S. PATENT DOCUMENTS

| | | | |
|---|---|---|---|
| 2007/0282951 A1* | 12/2007 | Selimis | H04L 67/06 709/205 |
| 2008/0086558 A1* | 4/2008 | Bahadori | G06F 11/3438 709/224 |
| 2009/0119301 A1* | 5/2009 | Cherkasova | G06Q 10/06 |
| 2011/0167156 A1* | 7/2011 | Mani | H04L 67/125 709/224 |
| 2014/0033055 A1* | 1/2014 | Gardner | H04L 41/22 715/736 |
| 2014/0365563 A1* | 12/2014 | Raghu | H04L 67/2804 709/203 |
| 2016/0226731 A1* | 8/2016 | Maroulis | H04L 43/065 |
| 2018/0329771 A1* | 11/2018 | Couture | G06F 11/0709 |

\* cited by examiner

MONITORING A NETWORK SESSION

BACKGROUND

The World Wide Web has expanded to provide numerous web services to consumers. The web services may be provided by a web application which uses multiple services and applications to handle a transaction. The applications may be distributed over several machines, making the topology of the machines that provide the service more difficult to track and monitor.

Monitoring a web application helps to provide insight regarding bottle necks in communication, communication failures and other information regarding performance of the services that provide the web application. Most application monitoring tools provide a standard report regarding application performance. Though the typical report may be helpful for most users, it may not provide the particular information that an administrator wants to know.

For example, most application performance monitoring systems monitor a single application or a single request as it traverses through a set of distributed applications. This is valuable to some users, but the single request does not truly correlate to a user's entire experience with a web service. Rather, users often perform several actions, each associated with a separate request, and experience with the web service is based on the cumulative processing of the different requests. What is needed is an improved way to monitor a user experience with a web service.

SUMMARY

A session, consisting of multiple page views by a user with a web service, is monitored, analyzed, and diagnosed for a user. The session may include one or more requests or page views experienced by a user during the session. The session, in an implementation, may be defined as the user experience on a series of network content pages visited through a single instance of a network browser. The session may be determined to end when no activity is detected from the user for a specified period of time. In other implementations, a session may be based on a user indication, a set period of time, or for some other reason. The data collected during the session may include monitored application data, monitored network data, monitored machine data, as well as other data such as user activity, browser activity, and other data. The data is collected by one or more agents throughout the system, reported to a controller, and correlated together at the controller for querying and reporting. The correlated data is reported by the controller to a user through an interface. The interface may include page view data, timeline data, and general information regarding the session. When monitoring a session for a mobile device, the page views may be replaced by screen views.

An embodiment may include a method for monitoring a network session. The method may begin with monitoring a plurality of applications on a plurality of servers during a network session. The network session may span multiple content pages provided to a user, and the plurality of applications may be monitored by a plurality of agents installed on the plurality of servers. Data reported by the plurality of agents may be correlated by a remote server, wherein the data is associated with monitoring the plurality of applications during the session. Session health may be reported based on the correlated data through an interface, the interface including content page information for the multiple content pages provided to the user during the session and user activity during the session.

An embodiment may include a system for monitoring a network session. The system may include a processor, memory, and one or more modules stored in memory and executable by the processor. When executed, the modules may monitor a plurality of applications on a plurality of servers during a network session, the network session spanning multiple content pages provided to a user, the plurality of applications monitored by a plurality of agents installed on the plurality of servers, correlate data reported by the plurality of agents by a remote server, the data associated with monitoring the plurality of applications during the session, and report session health based on the correlated data through an interface, the interface including content page information for the multiple content pages provided to the user during the session and user activity during the session.

DETAILED DESCRIPTION

The present technology monitors a session, consisting of multiple page views by a user with a web service. The session may be monitored, analyzed, and diagnosed. The session may include one or more requests or page views experienced by a user during the session. The session, in an implementation, may be defined as the user experience on a series of network content pages visited through a single instance of a network browser. The session may be determined to end when no activity is detected from the user for a specified period of time. In other implementations, a session may be based on a user indication, a set period of time, or for some other reason.

The data collected during the session may include monitored application data, monitored network data, monitored machine data, as well as other data such as user activity, browser activity, and other data. The data is collected by one or more agents throughout the system, reported to a controller, and correlated together at the controller for querying and reporting. The correlated data is reported by the controller to a user through an interface. The interface may include page view data, timeline data, and general information regarding the session. When monitoring a session for a mobile device, the page views may be replaced by screen views.

Figure 1:
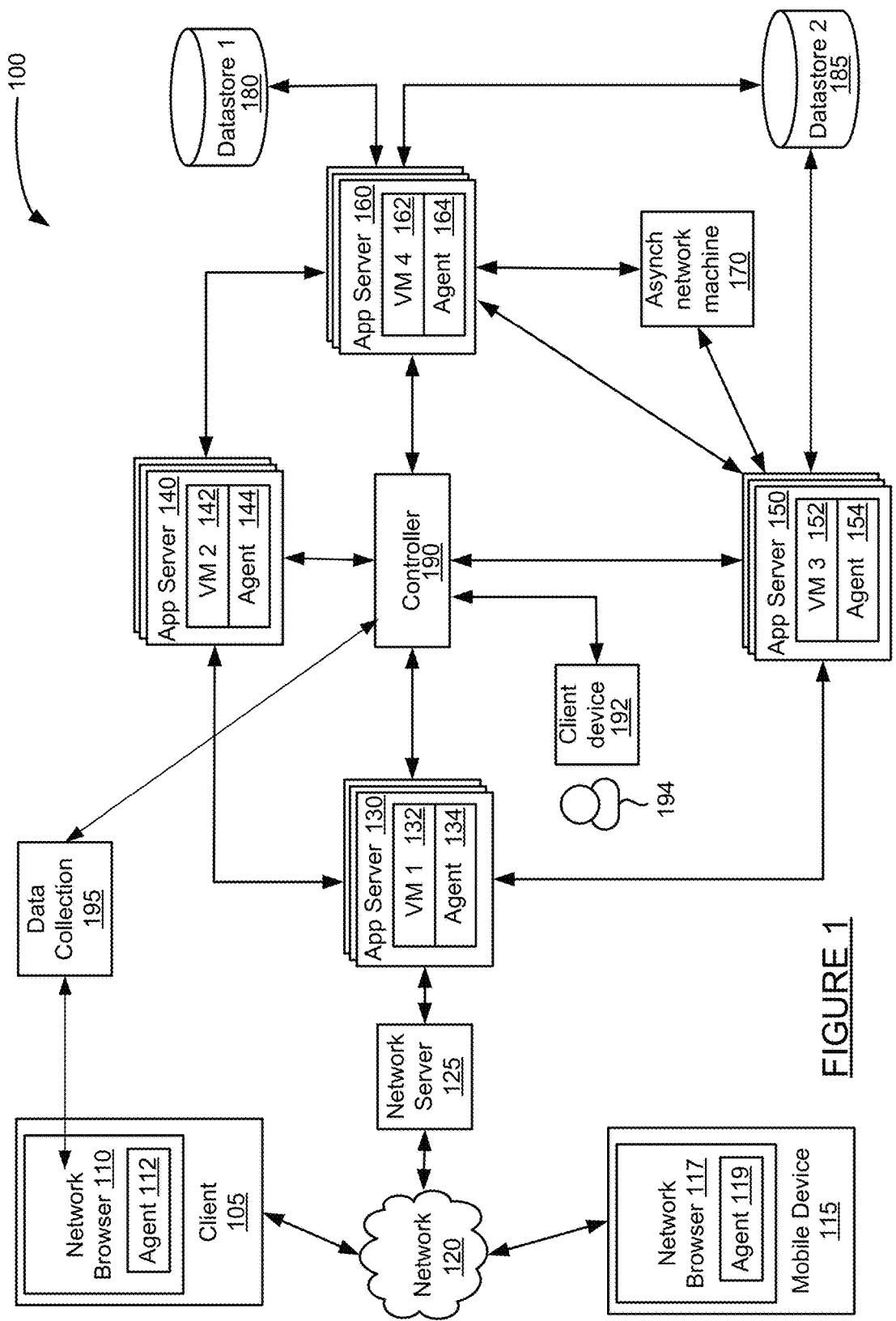
FIG. 1 is a block diagram of a system for monitoring a session.

FIG. 1 is a block diagram of a system for correlating an application and network performance data. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be installed on network browser 110 and/or client 105 as a network browser add-on, downloading the application to the server, or in some other manner. Agent 112 may be executed to monitor network browser 110, the operation system of client 105, user interactions with content pages and user activity at the client 105, and any other application, API, or other component of client 105. Agent 112 may determine network browser navigation timing metrics, access browser cookies, monitor code, and transmit data to data collection 160, controller 190, or another device. Agent 112 may perform other operations related to monitoring a request or a network at client 105 as discussed herein.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may report data to data collection server 160 and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks. The network 120 may include one or more machines such as load balance machines and other machines.

Network server 125 is connected to network 120 and may receive and process requests received over network 120. Network server 125 may be implemented as one or more servers implementing a network service, and may be implemented on the same machine as application server 130. When network 120 is the Internet, network server 125 may be implemented as a web server. Network server 125 and application server 130 may be implemented on separate or the same server or machine.

Application server 130 communicates with network server 125, application servers 140 and 150, and controller 190. Application server 130 may also communicate with other machines and devices (not illustrated in FIG. 1). Application server 130 may host an application or portions of a distributed application. The host application 132 may be in one of many platforms, such as for example a Java, PHP, .NET, Node.JS, be implemented as a Java virtual machine, or include some other host type. Application server 130 may also include one or more agents 134 (i.e. "modules"), including a language agent, machine agent, and network agent, and other software modules. Application server 130 may be implemented as one server or multiple servers as illustrated in FIG. 1.

Application 132 and other software on application server 130 may be instrumented using byte code insertion, or byte code instrumentation (BCI), to modify the object code of the application or other software. The instrumented object code may include code used to detect calls received by application 132, calls sent by application 132, and communicate with agent 134 during execution of the application. BCI may also be used to monitor one or more sockets of the application and/or application server in order to monitor the socket and capture packets coming over the socket.

In some embodiments, server 130 may include applications and/or code other than a virtual machine. For example, server 130 may include Java code, .NET code, PHP code, Ruby code, C code or other code to implement applications and process requests received from a remote source.

Agents 134 on application server 130 may be installed, downloaded, embedded, or otherwise provided on application server 130. For example, agents 134 may be provided in server 130 by instrumentation of object code, downloading the agents to the server, or in some other manner. Agents 134 may be executed to monitor application server 130, monitor code running in a host or on a virtual machine 132 (or other program language, such as a PHP, .NET, or C program), machine resources, network layer data, and communicate with byte instrumented code on application server 130 and one or more applications on application server 130.

Each of agents 134, 144, 154 and 164 may include one or more agents, such as a language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 134 may detect operations such as receiving calls and sending requests by application server 130, resource usage, and incoming packets. Agent 134 may receive data, process the data, for example by aggregating data into metrics, and transmit the data and/or metrics to controller 190. Agent 134 may perform other operations related to monitoring applications and application server 130 as discussed herein. For example, agent 134 may identify other applications, share business transaction data, aggregate detected runtime data, and other operations.

An agent may operate to monitor a node, tier or nodes or other entity. A node may be a software program or other hardware component (memory, processor, and so on). A tier of nodes may include a plurality of nodes which may process a similar business transaction, may be located on the same server, may be associated with each other in some other way, or may not be associated with each other.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application Ser. No. 12/878,919, titled "Monitoring Distributed Web Application Transactions," filed on Sep. 9, 2010, U.S. Pat. No. 8,938,533, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and agents. Each application may run on the corresponding application server. Each of applications 142, 152 and 162 on application servers 140-160 may operate similarly to application 132 and perform at least a portion of a distributed business transaction. Agents 144, 154 and 164 may monitor applications 142-162, collect and process data at runtime, and communicate with controller 190. The applications 132, 142, 152 and 162 may communicate with each other as part of performing a distributed transaction. In particular each application may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive application data, including data associated with monitoring client requests at client 105 and mobile device 115, from data collection server 160. In some embodiments, controller 190 may receive application monitoring data, machine monitoring data, and network data from each of agents 112, 119, 134, 144 and 154. Controller 190 may associate portions of business transaction data, communicate with agents to configure collection of data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, work station or other computing device. Client computer 192 may communicate with controller 190 to create and view a custom interface. In some embodiments, controller 190 provides an interface for creating and viewing the custom interface as content page, e.g. a web page, which may be provided to and rendered through a network browser application on client device 192.

Figure 2:
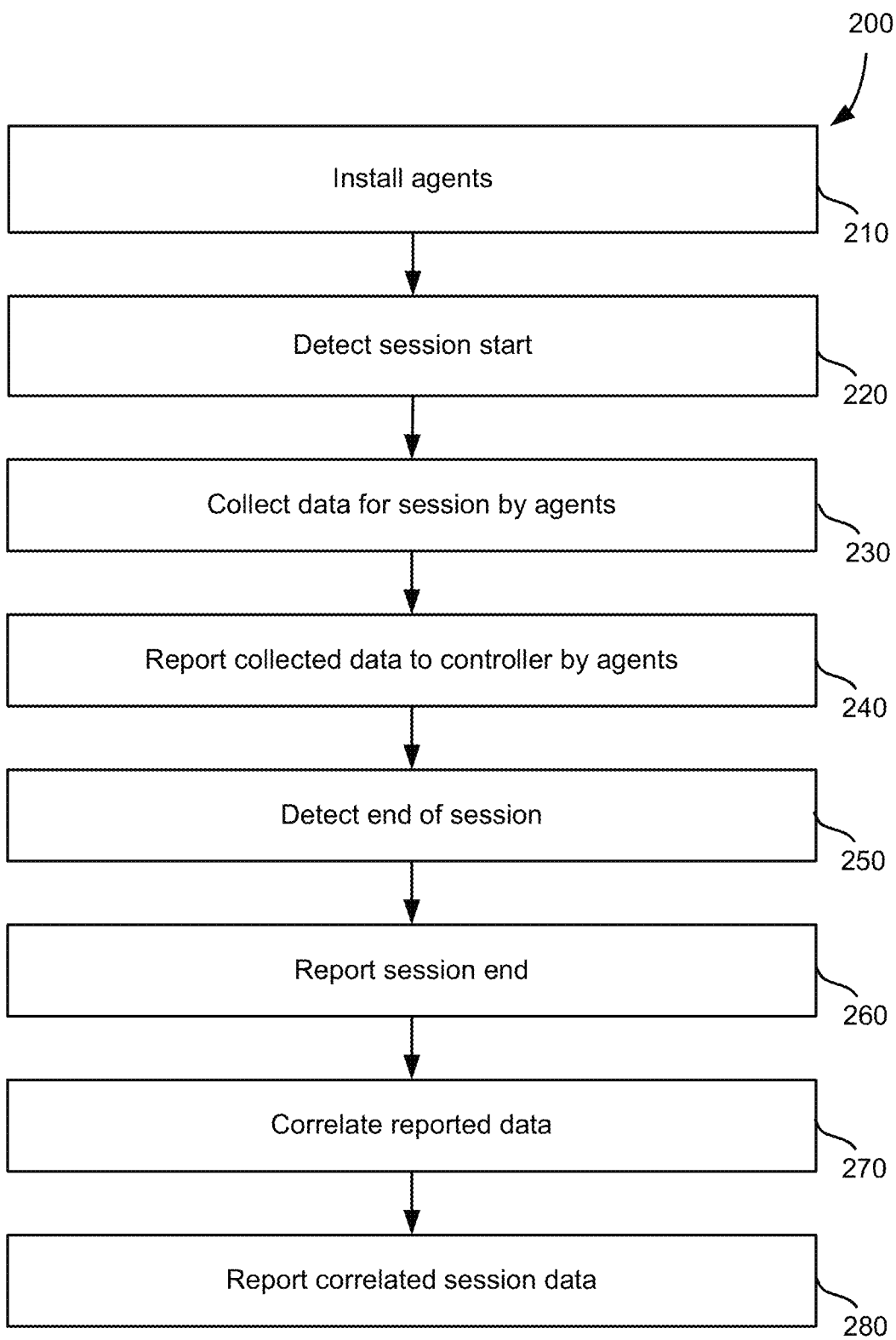
FIG. 2 is a method for monitoring a session.

FIG. 2 is a method for monitoring a session. The method of FIG. 2 begins with installing agents at step 210. The agents may be installed on a mobile device, client device, servers which host applications, databases, and other machines. Next, the start of a session is detected at step 220. A session start may be triggered by the selection to load a content page in a provided by web service being monitored. The session may also be started in different ways, such as clicking a particular page provided by web service.

Data is collected for the session by agents at step 230. The agents may monitor the application, machine, and network, as well as user activity. The data collected by the agents is stored, rolled up into metrics, and eventually reported. Collecting data for a session by one or more agents is discussed in more detail below with respect to the method of FIG. 3.

Collected data is reported to a controller by agents at step 240. The data collected and reported may include raw data collected by the agents, metrics generated from the data, and other data such as for example images or video of content pages provided to a user through a content browser. The reported data may include a session identifier to enable subsequent correlation of the data. The session identifier may be generated by an agent at content browser, an agent processing a request as part of a session, or some other entity. The data may be reported periodically, in response to an event with the agent, or by a request of the controller.

Next, the end of the session is detected step 250. The end of the session may be determined by a user indication, the completion of a particular business transaction, a period of inactivity detected at the network browser associated with the session, or some other reason. A session end is reported at step 260. Reported data is then correlated at step 270 by a controller. The controller receives data associated with the session from multiple agents. The controller may then correlate the data using the session identifier that is associated with each piece of data received. Correlation may include stitching together each page view in the order it occurred for the user, and organizing the user of resources, calls, requests, user activity, and other events in the order they were utilized for each page view.

Correlated session data may then be reported at step 280. The correlated data may be reported through a user interface as page view data, timeline data, session details, and other information. More information or for reporting correlated session data is discussed with respect to FIG. 4.

Figure 3:
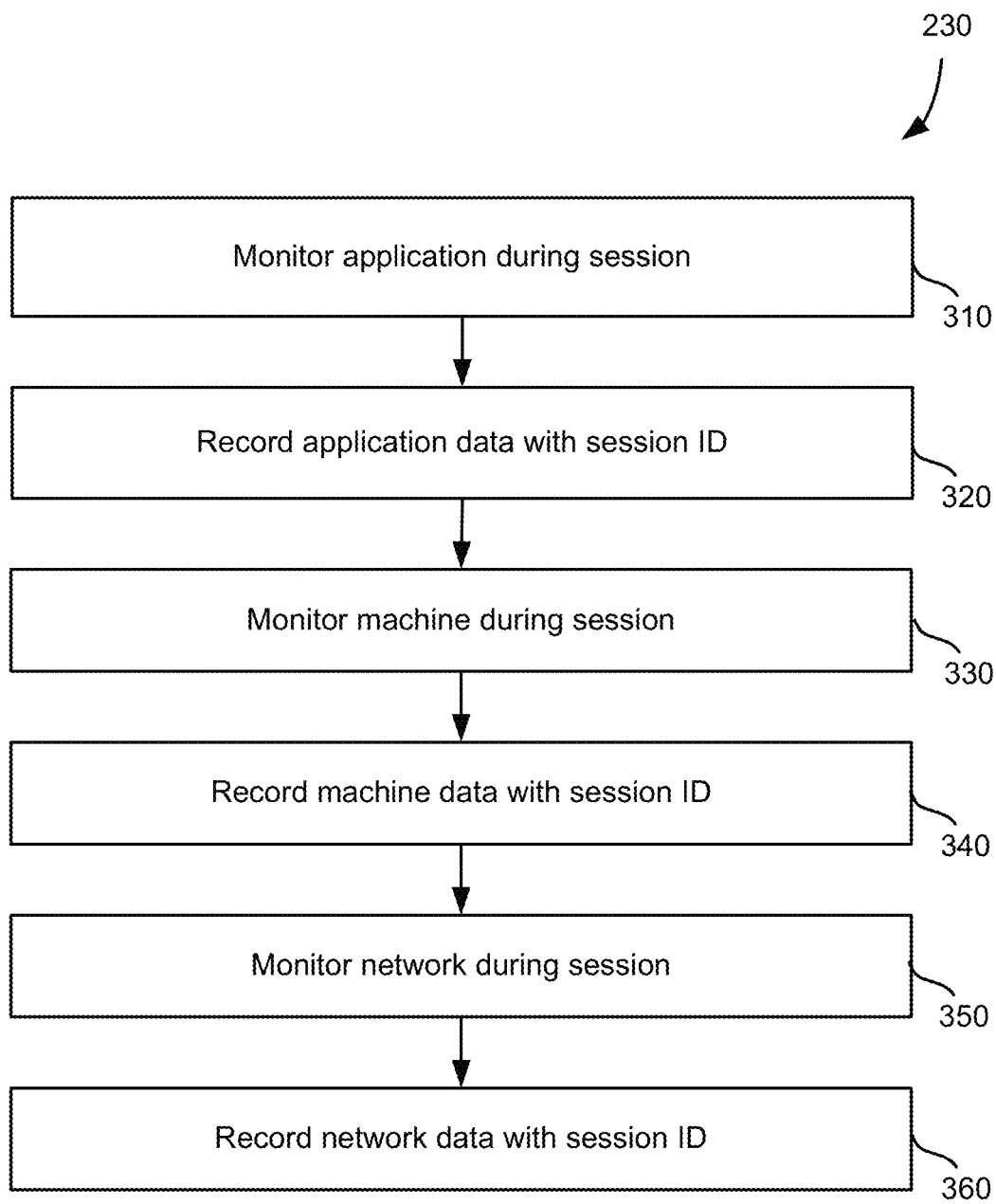
FIG. 3 is a method for collecting data for a session by agents.

FIG. 3 is a method for collecting data for a session by agents. The method of FIG. 3 provides more detail for step 230 of the method of FIG. 2. First, an application is monitored during the session at step 310. The monitored applications may include a server application and a client application. As part of monitoring a client application, user activity, browser interface activity, and the browser application itself may be monitored. Next, application data is recorded with a session identifier at step 320 A machine is monitored during the session at step 330. Machine monitoring may result in metrics for CPU usage, memory usage, and other machine performance. Machine data is then recorded with the same session ID as the application data at step 340. A network is monitored during the session at step 350. Monitoring the network may include performing packet capture at a socket to detect network data. The network data may be rolled up into metrics such as latency, packet loss, throughput, and other data. Network data is then recorded with the session ideas step 360

Figure 4:
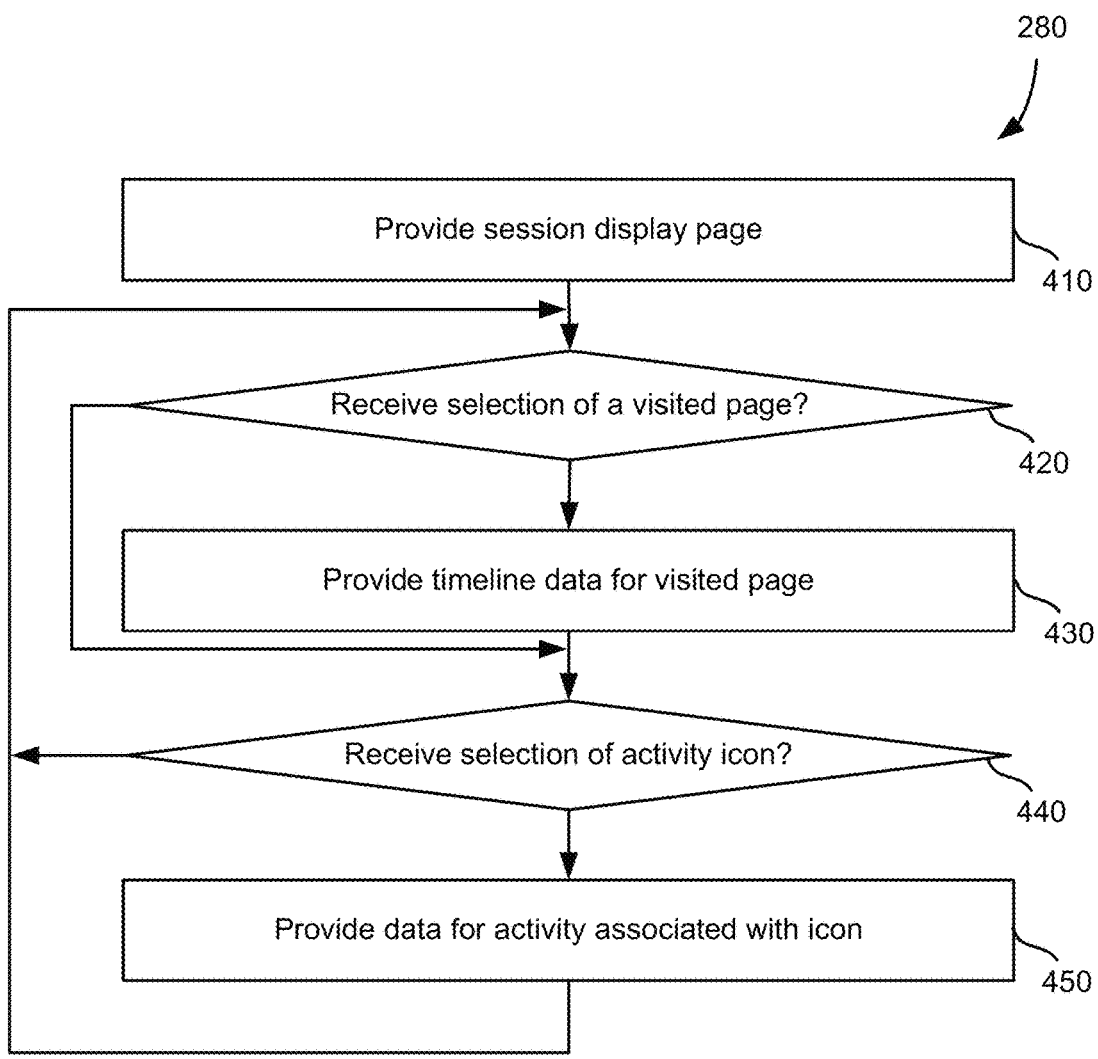
FIG. 4 is a method for reporting correlated session data.

FIG. 4 provides a method for reporting correlated session data. The method of FIG. 4 provides more detail for step 280 of the method of FIG. 2. The method of FIG. 4 begins with providing a session display page at step 410. An example of a session display page is provided in FIG. 5. The interface of FIG. 5 includes session detail information 510, page view information 520, and timeline 530, all as part of session display page 500. A determination is made as to whether a selection of a visited page is received through the display page at step 420. If a selection of a visited page is received, timeline data for that visited page is provided in the interface at step 430 and the method continues to step 440. If no selections received for a visit page, the method of FIG. 4 continues to step 440.

A determination is made as to whether a selection is received for an activity icon at step 440. The selection of an activity icon may be in the form of selecting a shaded bar in the timeline section 530. The selection may be performed by a user click, hovering the mouse over the section, or some other input. If no selection is received, the method of FIG. 4 returns to step 420. If the selection is received, data associated with the icon is provided at step 450

Figure 5:
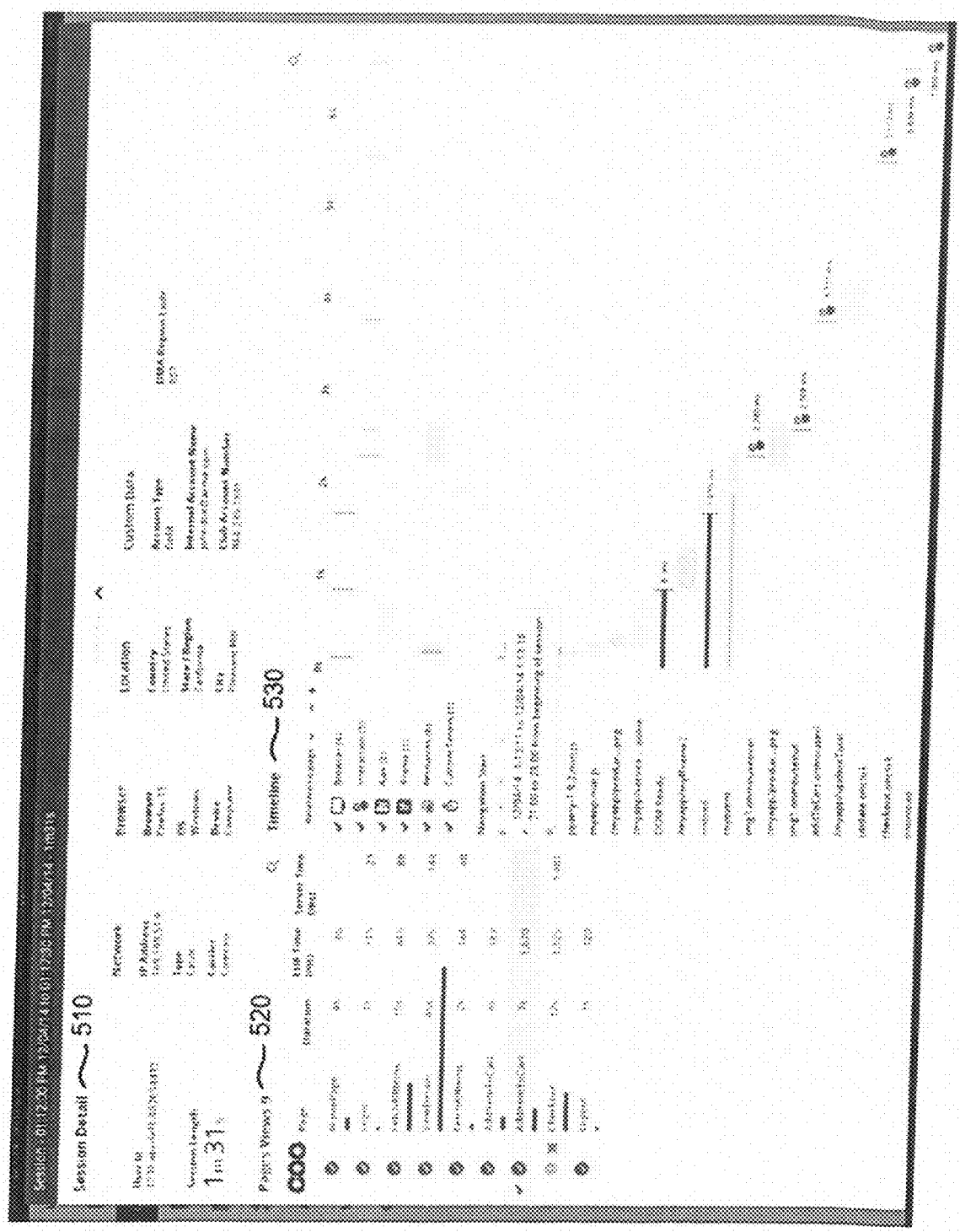
FIG. 5 is an interface for reporting session data.

The interface of FIG. 5 provides data associated with a monitored session. Session detail section 510 may include identifying information regarding the particular session. For example, session detail section 510 may include network information such as an IP address, type and carrier, browser information such as a browser type, operating system, device, location information, and custom data.

Page view section 520 provides information for each page visited by a user. Information includes an icon representing the user experience for each page (e.g., a representation of the time to load the page), error conditions, page description, duration of time at that page, the end user response time, the server time to process the request to provide the page.

A timeline section 530 of the interface 500 may include a summary section and list of activities that occurred during the session. The summary section groups activities into categories, such as browser, interaction, Ajax, iframe, resources, and custom timers. The time spent on each of these activities and/or categories is listed via colored bar graphs along a time axis. The activity list lists each activity or event to occur during the session, in the order in which it happened, and includes a matching colored bar along the same time line as the summary section.

The interface of FIG. 5 is interactive, providing more information to a user in response to user input. For example, if a user selects a particular page view, the timeline section shows summary data and an activity list for the activities and events that correspond to that particular page view. If a user selects a particular summarized activity, more information may be provided, for example in the form of a pop-up window. In some instances, the interface will scroll down to the corresponding entry in the activity list. If the user selects an activity in the activity list, more information for the duration of that activity may be provided, for example in the form of a pop-up window.

Interface of FIG. 5 also allows a user to select a page view for which the user can view video to watch the user experience. The page may be selected in the page view section, and the corresponding playback may then be selected and viewed. Similarly, a user may select to view images associated with particular activities or page views.

Figure 6:
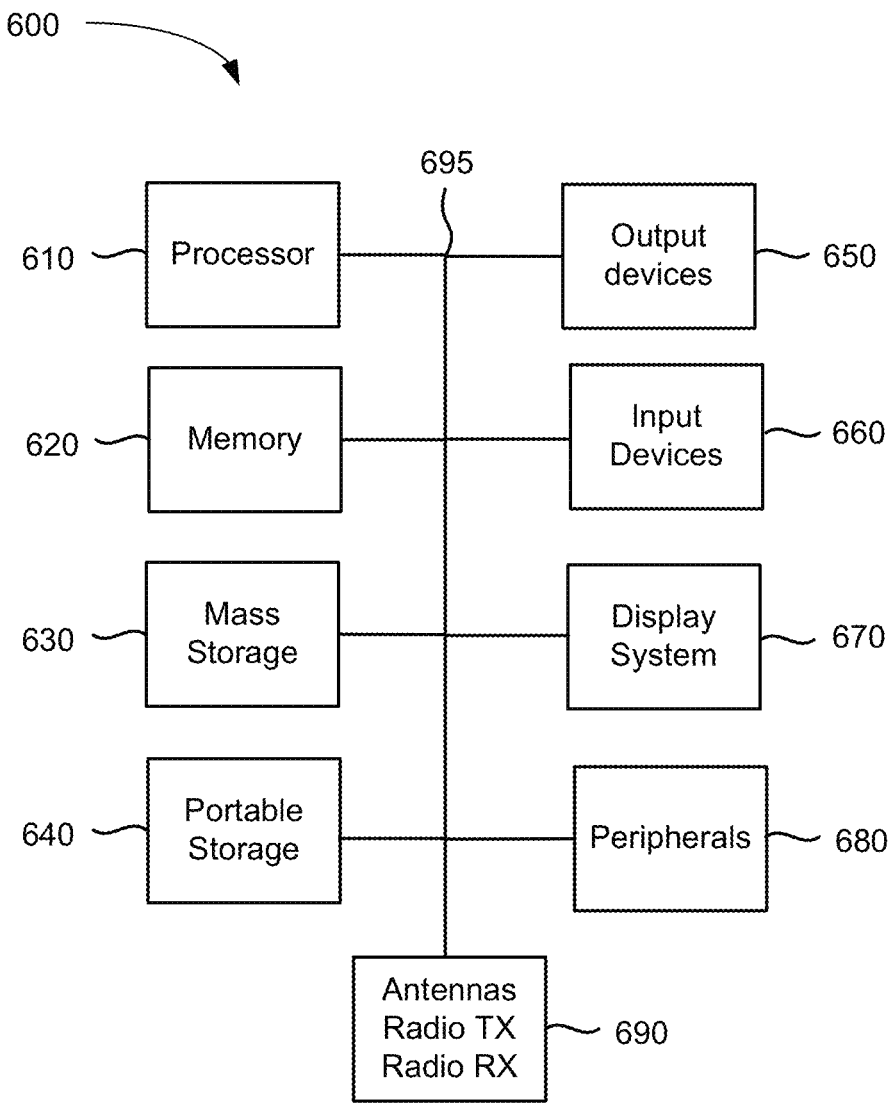
FIG. 6 is a block diagram of a computing system for implanting the present technology.

FIG. 6 is a block diagram of a system for implementing the present technology. System 600 of FIG. 6 may be implemented in the contexts of the likes of client computer 105 and 192, servers 125, 130, 140, 150, and 160, machine 170, data stores 180 and 190, and controller 190. The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 690. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive, an optical disk drive, a flash drive, or other device, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a floppy disk, compact disk or Digital video disc, USB drive, memory card or stick, or other portable or removable memory, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device. Display system 670 may also receive input as a touch-screen.

Peripherals 680 may include any type of computer support device to add additional functionality to the computer system. For example, peripheral device(s) 680 may include a modem or a router, printer, and other device.

The system of 600 may also include, in some implementations, antennas, radio transmitters and radio receivers 690. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth devices, and other radio frequency networks. The devices may include one or more radio transmitters and receivers for processing signals sent and received using the antennas.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method comprising:
    detecting a start of a network session of a user, the network session spanning multiple content pages provided to the user during a period of activity, wherein a session identifier is generated for the network session;
    communicating with a plurality of agents installed on a plurality of servers, wherein the plurality of agents are configured to collect data associated with a plurality of applications executed during the network session;
    receiving, at a remote server, data collected by the plurality of agents during the network session, wherein the data includes:
        application data reported with the session identifier, the application data associated with one or more of the plurality of applications executed during the network session,
        network data reported with the session identifier, the network data associated with operation of a computer network over which one or more of the multiple content pages were provided to the user during the network session, and
        machine data reported with the session identifier, the machine data associated with one or more machines used during the session;
    determining, by the remote server, that the network session associated with the session identifier is no longer active based on no activity by the user for a period of time;
    correlating the data received at the remote server from the plurality of agents with the network session of the particular user based on the session identifier received with the data; and
    reporting, by the remote server, session health based on the correlated data through an interface, the interface including content page information for the multiple content pages provided to the user during the network session and user activity during the network session.

2. The method of claim 1, wherein the network data is collected and reported by a network agent of the plurality of agents.

3. The method of claim 1, wherein the one or more machines are selected from a group consisting of one or more servers of the plurality of servers and a client device and the machine data is collected and reported by a machine agent of the plurality of agents.

4. The method of claim 1, wherein reporting session health includes providing timing data associated with resources, user interactions, and client application processing.

5. The method of claim 1, wherein reporting session health includes providing an indication of a user experience for a particular page during the session.

6. The method of claim 1, wherein reporting session health includes providing an indication of a time spent at a particular page during the network session.

7. The method of claim 1, further comprising providing additional data associated with an activity upon receiving user input selecting the activity.

8. The method of claim 1, wherein reporting includes providing an image or a video of the content pages provided to the user during the network session.

9. The method of claim 1, wherein reporting includes providing a playback of a user experience navigating the content pages provided to the user during the network session.

10. A tangible, non-transitory, computer-readable media having software encoded thereon, the software when executed by a processor of a device operable to:
    detect a start of a network session of a user, the network session spanning multiple content pages provided to the user during a period of activity, wherein a session identifier is generated for the network session;
    communicate a plurality of agents installed on a plurality of servers, wherein the plurality of agents are configured to collect data associated with a plurality of applications executed during the network session;
    receive data collected by the plurality of agents during the network session, wherein the data includes:
        application data reported with the session identifier, the application data associated with one or more of the plurality of applications executed during the network session,
        network data reported with the session identifier, the network data associated with operation of a computer network over which one or more of the multiple content pages were provided to the user during the network session, and
        machine data associated with the session identifier, the machine data associated with one or more machines used during the session;
    determine that the network session associated with the session identifier is no longer active based on no activity by the user for a period of time;
    correlate the data received from the plurality of agents with the network session of the particular user based on the session identifier received with the data; and
    report session health based on the correlated data through an interface, the interface including content page information for the multiple content pages provided to the user during the network session and user activity during the network session.

11. The tangible, non-transitory, computer-readable media of claim 10, wherein the network data is collected and reported by a network agent of the plurality of agents.

12. The tangible, non-transitory, computer-readable media of claim 10, wherein the one or more machines are selected from a group consisting of one or more servers of the plurality of servers and a client device and the machine data is collected and reported by a machine agent of the plurality of agents.

13. The tangible, non-transitory, computer-readable media of claim 10, wherein reporting session health includes providing timing data associated with resources, user interactions, and client application processing.

14. The tangible, non-transitory, computer-readable media of claim 10, wherein reporting session health includes providing an indication of a user experience for a particular page during the network session.

15. The tangible, non-transitory, computer-readable media of claim 10, wherein reporting session health includes providing an indication of a time spent at a particular page during the network session.

16. The tangible, non-transitory, computer-readable media of claim 10, wherein the software when executed by the processor of the device is further operable to provide additional data associated with an activity upon receiving user input selecting the activity.

17. The tangible, non-transitory, computer-readable media of claim 10, wherein reporting includes providing an image or a video of the content pages provided to the user during the network session.

18. The tangible, non-transitory, computer-readable media of claim 10, wherein reporting includes providing a playback of a user experience navigating the content pages provided to the user during the network session.

19. An apparatus comprising:
a one or more network interfaces to communicate with a plurality of agents installed on one or more servers and at least one client device, wherein the plurality of agents are configured to collect data associated with a plurality of applications;
a processor coupled to the network interfaces and configured to execute one or more processes; and
a memory configured to store a process executable by the processor, the process when executed operable to:
detect a start of a network session of a user, the network session spanning multiple content pages provided to the user during a period of activity, wherein a session identifier is generated for the network session
receive data collected by the plurality of agents during the network session, wherein the data includes:
application data reported with the session identifier, the application data associated with one or more of the plurality of applications executed during the network session,
network data reported with the session identifier, the network data associated with operation of a computer network over which one or more of the multiple content pages were provided to the user during the network session, and
machine data reported with the session identifier, the machine data associated with one or more machines used during the session;
determine that the network session associated with the session identifier is no longer active based on no activity by the user for a period of time;
correlate the data received from the plurality of agents with the network session of the particular user based on the session identifier received with the data; and
report session health based on the correlated data through user interface, the user interface including content page information for the multiple content pages provided to the user during the network session and user activity during the network session.

20. The apparatus of claim 19, the network data is collected and reported by a network agent of the plurality of agents.

21. The apparatus of claim 19, wherein the one or more machines are selected from a group consisting of one or more servers of the plurality of servers and a client device and the machine data is collected and reported by a machine agent of the plurality of agents.

22. The apparatus of claim 19, wherein reporting session health includes providing timing data associated with resources, user interactions, and client application processing.

23. The apparatus of claim 19, wherein reporting session health includes providing an indication of a user experience for a particular page during the network session.

24. The apparatus of claim 19, wherein reporting session health includes providing an indication of a time spent at a particular page during the network session.

25. The apparatus of claim 19, wherein the process when executed is further operable to: report additional data associated with an activity upon receiving user input selecting the activity.

26. The apparatus of claim 19, wherein reporting includes providing an image or a video of the content pages provided to the user during the network session.

27. The apparatus of claim 19, wherein reporting includes providing a playback of a user experience navigating the content pages provided to the user during the network session.

* * * * *